March 25, 1952 R. CHILTON 2,590,231
AUTOMATIC TRANSMISSION CONTROL
Filed July 12, 1946 7 Sheets-Sheet 1
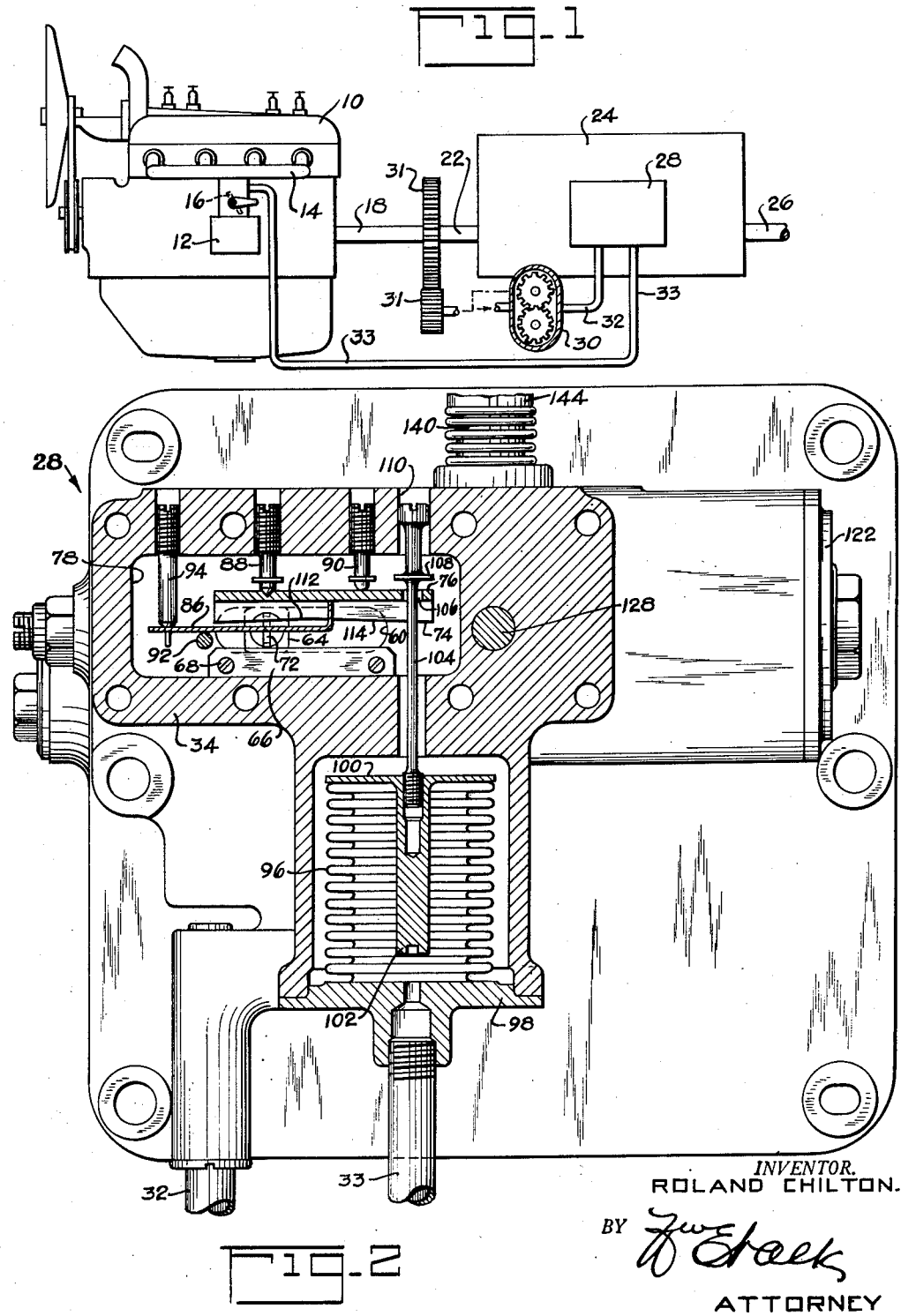
INVENTOR.
ROLAND CHILTON.
BY
ATTORNEY

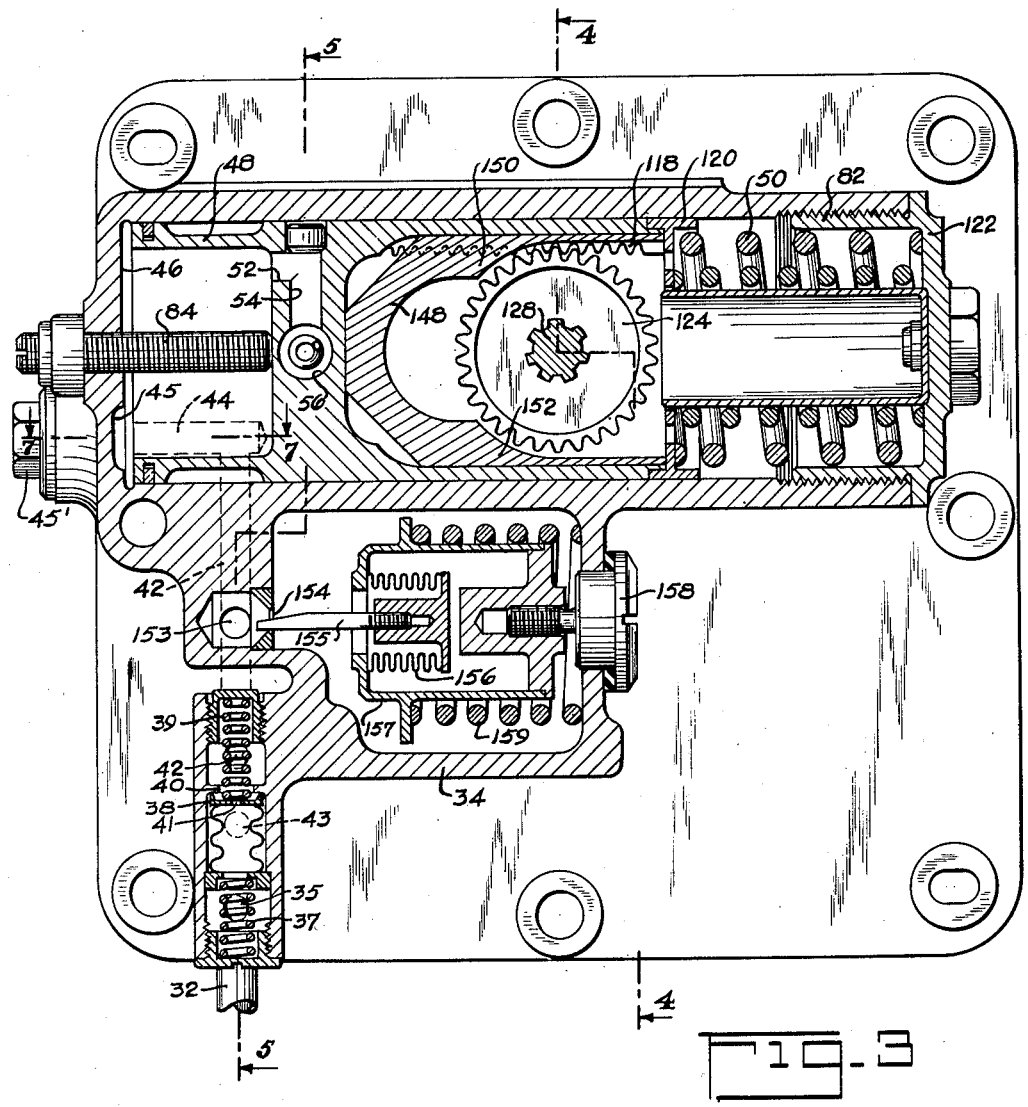

March 25, 1952  R. CHILTON  2,590,231
AUTOMATIC TRANSMISSION CONTROL
Filed July 12, 1946  7 Sheets-Sheet 4
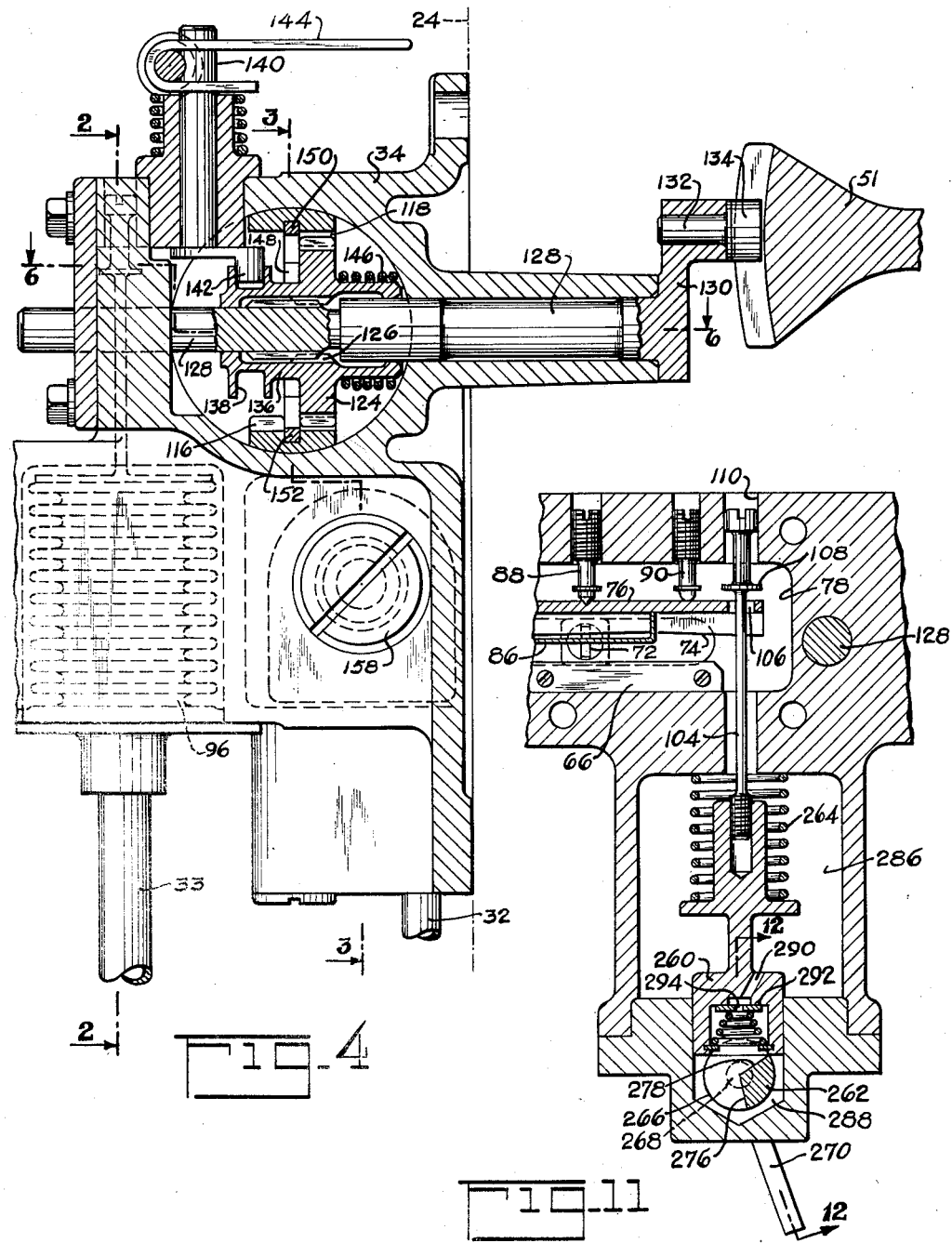
INVENTOR.
ROLAND CHILTON.
BY
ATTORNEY March 25, 1952  R. CHILTON  2,590,231
AUTOMATIC TRANSMISSION CONTROL
Filed July 12, 1946  7 Sheets-Sheet 5
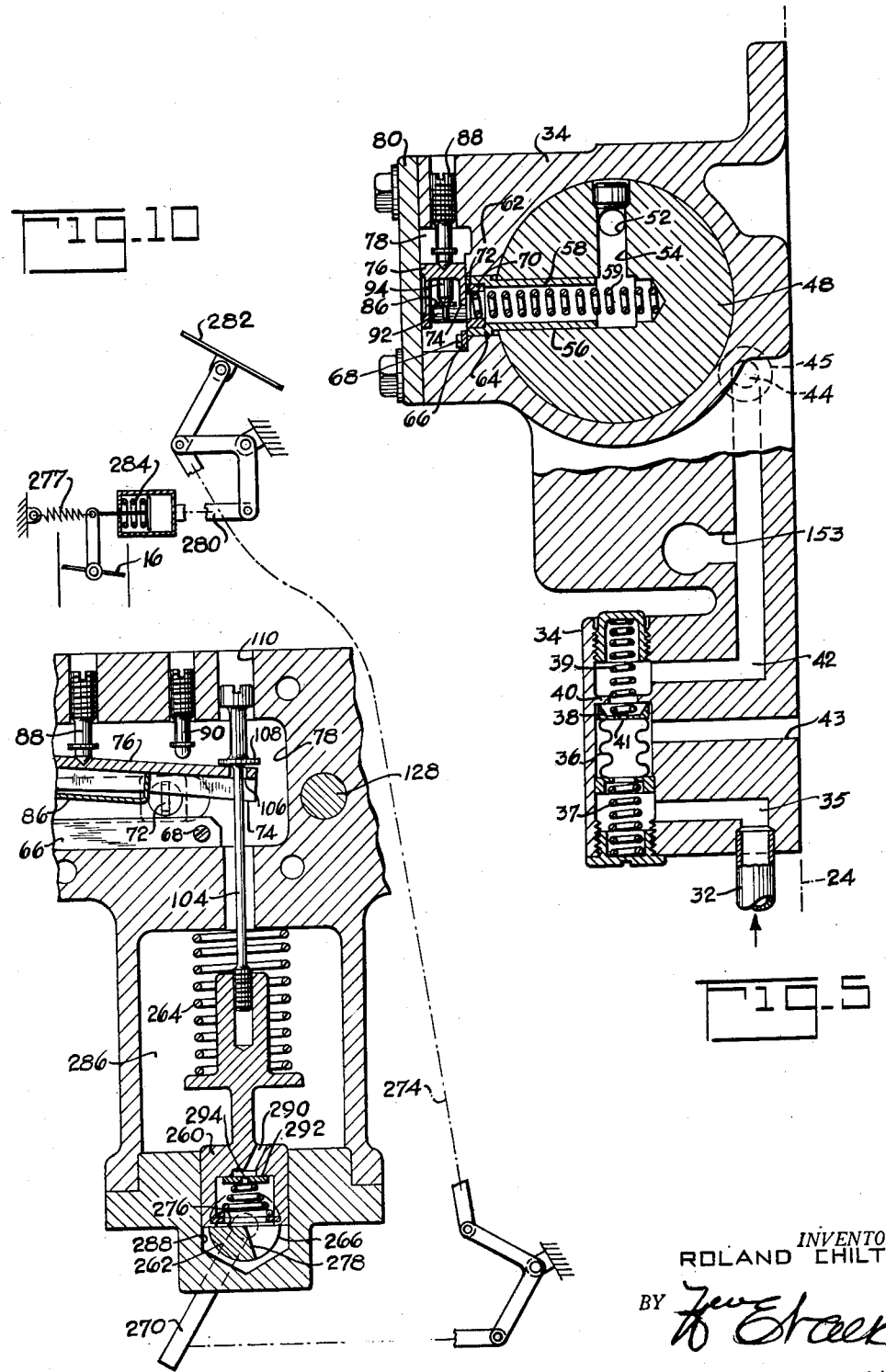
INVENTOR.
ROLAND CHILTON
BY
ATTORNEY March 25, 1952 R. CHILTON 2,590,231
AUTOMATIC TRANSMISSION CONTROL
Filed July 12, 1946 7 Sheets-Sheet 6
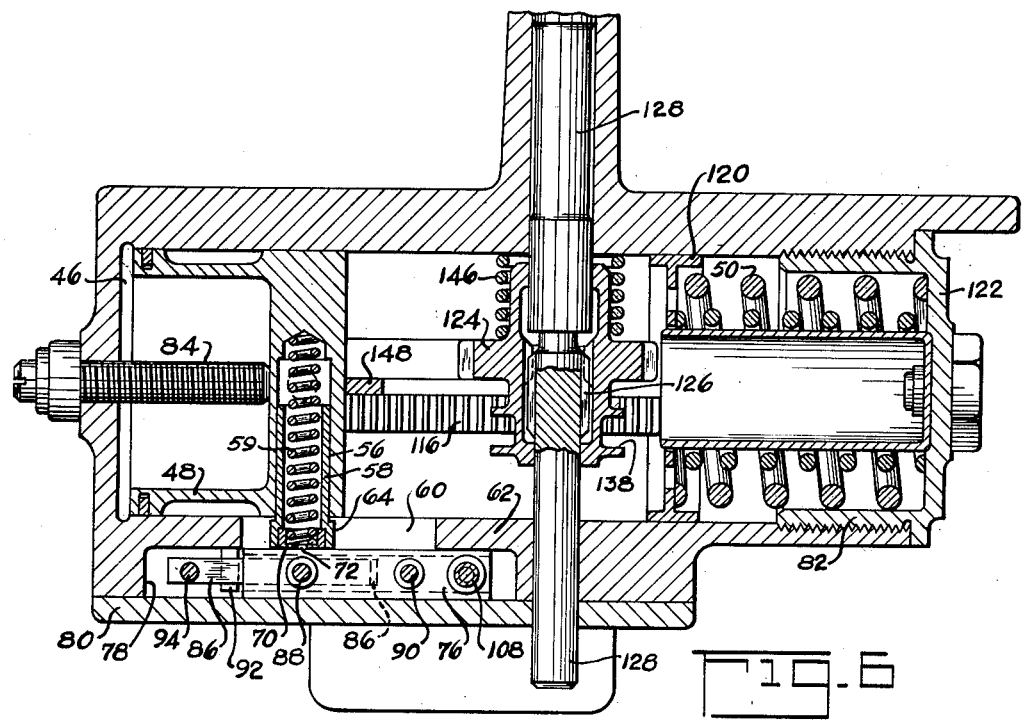
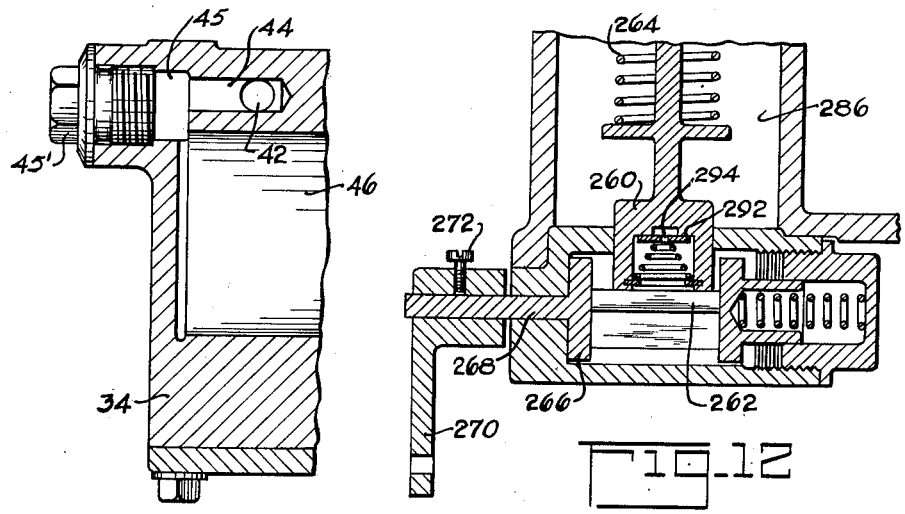
INVENTOR.
ROLAND CHILTON
BY
ATTORNEY

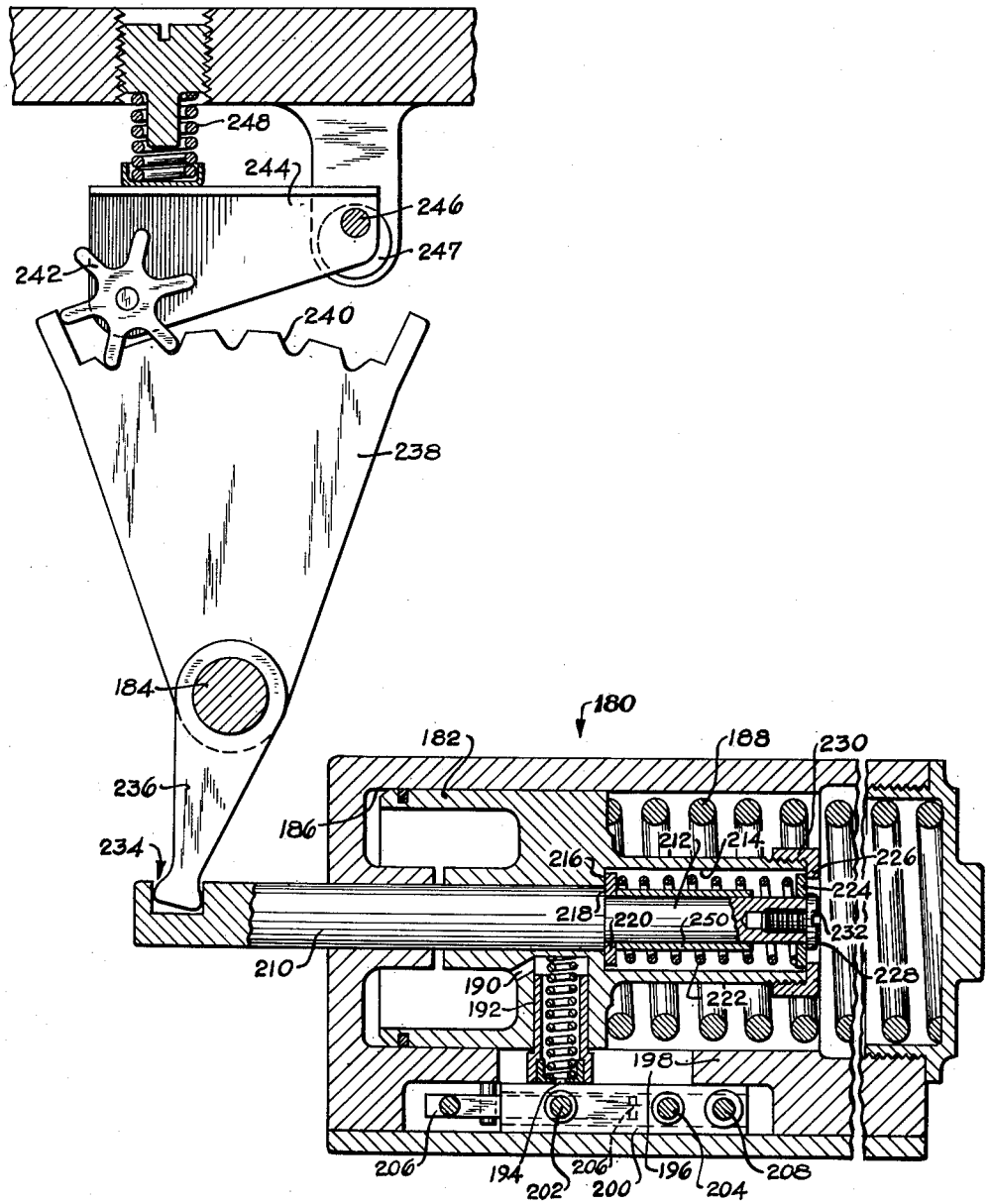

Patented Mar. 25, 1952

2,590,231

UNITED STATES PATENT OFFICE 2,590,231

AUTOMATIC TRANSMISSION CONTROL

Roland Chilton, Glen Rock, N. J.

Application July 12, 1946, Serial No. 683,134

23 Claims. (Cl. 74—336)

My invention relates to control means for multi-speed transmissions and is particularly directed to new and improved automatic means for controlling the speed ratio of such a transmission. The invention is herein described in connection with an automotive vehicle transmission. However, as will appear, the invention is not limited to use in this specific environment.

Unless otherwise stated, the "speed ratio" of the transmission, as herein used, always refers to the quotient of the speed of the transmission output shaft divided by the speed of the transmission input shaft.

One object of the invention is to provide a novel and improved vehicle transmission control device which is responsive to both engine torque and vehicle or engine speed for automatically adjusting the transmission speed ratio. Specifically, the control device is designed so that it tends to effect a reduction in the transmission speed ratio with increase in engine torque or with decrease in engine or vehicle speed and vice versa.

It is a further object of the invention to eliminate the usual manually operable clutch and gear shift of multi-speed transmissions and to provide a novel control device which automatically adjusts the transmission speed ratio with changes in the operating condition of the vehicle or other mass being driven. Therefore, with the control device of the present invention, the operator controls the power output of the prime mover, e. g. by means of the throttle valve of a conventional internal combustion engine, while the control device automatically adjusts the speed ratio of the transmission.

The operation of the control device is such that an increase in engine or vehicle speed, the control device shifts the transmission toward a higher speed ratio and vice versa. Also, when the engine is operating with its throttle substantially fully open or in its high torque range, the control device shown operates to shift the transmission toward a lower speed ratio upon further opening movement of the engine throttle. In one modification of the invention, the control device is responsive to engine intake manifold pressure to decrease the transmission speed ratio when the manifold pressure exceeds a predetermined high value, the manifold pressure being substantially proportional to engine torque. In a second modification of the invention, when the engine throttle is fully or substantially fully open, further depression of the usual engine throttle pedal results in a shift of the transmission toward a lower speed ratio.

A still further object of the invention is to provide a transmission speed-ratio control device which has a wide range of pre-adjustment whereby the speed-ratio shift characteristics may readily be varied to suit a wide range of vehicle engine powers, weights, speeds and types of vehicle service.

Other objects of the invention will become apparent upon reading the annexed detailed description in connection with the drawing in which:

Figure 1 is a schematic view illustrating an engine and multi-speed transmission therefor together with a speed-ratio control device embodying the present invention:

Figure 2 is a sectional view taken along line 2—2 of Figure 4 of the automatic control device and illustrating the metering bar in a full throttle position;

Figure 3 is a sectional view taken along line 3—3 of Figure 4;

Figure 4 is a sectional view taken along line 4—4 of Figure 3;

Figure 5 is a sectional view taken along line 5—5 of Figure 3;

Figure 6 is a sectional view taken along line 6—6 of Figure 4;

Figure 7 is a fragmentary sectional view taken along line 7—7 of Figure 3;

Figure 9 is a sectional view illustrating an application of the control device to a stepped-type of multi-speed transmission, this view otherwise corresponding to Figure 6;

Figure 2A:
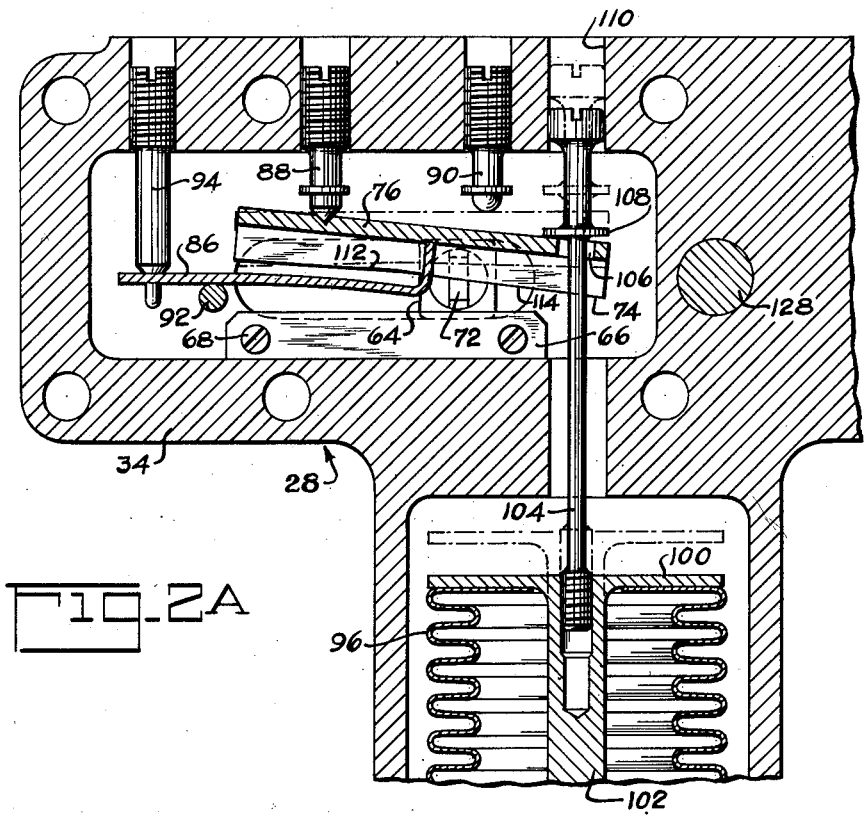
Figure 2A is an enlarged sectional view similar to Figure 2, but illustrating the metering bar in a part-throttle position and the control piston orifice in a high speed ratio position.

Figures 10 and 11 are views similar to Figures 2A and 2 respectively but of a modified form of the invention; and Figure 12 is a sectional view along line 12—12 of Figure 11.

Referring to the drawing, an automotive vehicle engine, schematically indicated at 10, is provided with a carburetor 12 from which the engine combustion mixture is distributed to the various engine cylinders through an intake manifold 14 under the control of a throttle 16. The engine shaft 18 is connected to the input shaft 22 of a multi-speed-ratio transmission 24. The output shaft 26 of the transmission is connected to the driving wheels (not shown) of the automotive vehicle.

The present invention is directed to a control device 28 which automatically controls the speed ratio of the transmission 24 in response to changes in engine speed and to changes in engine torque. To this end, a pump 30 is drivably connected to the engine by gearing generally indicated at 31, and the output fluid pressure of the pump is transmitted to the control device 28 through a conduit 32. In addition, in one modification, the engine intake manifold pressure (or vacuum) is transmitted to the control device 28 through a conduit 33, the intake manifold pressure of conventional internal combustion engines for vehicles being a measure of the engine torque.

The automatic control device 28 is best seen in Figures 2–7. It comprises a housing 34 which is adapted to be bolted or otherwise secured to the housing of the multi-speed-ratio transmission 24 to be controlled. Although the control device 28 as illustrated is specifically designed for use with transmissions in which the speed ratio is progressively variable such as disclosed in my co-pending application Serial No. 557,477, now Patent No. 2,493,571, issued January 3, 1950, it will appear from the following description that the automatic transmission control of the present invention is not limited to use with any specific form of transmission. For example, as hereinafter described, the automatic control may be used also in conjunction with stepped types of multi-speed-ratio transmissions.

The pump 30 supplies a fluid, such as lubricating oil, under pressure to the control device 28 through the conduit 32. From the conduit 32, the fluid under pressure is supplied through a passage 35 in the housing 34 and thence into a chamber having a bellows 36 disposed therein. The lower end of the bellows 36 is fixedly held against an annular shoulder as by a spring 37 and a valve member 38 is carried by the free upper end of the bellows. A spring 39 urges the valve member 38 away from its seat 40. The fluid supplied by the pump 30 enters the lower end of the bellows 36 from the passage 35 and flows upwardly through a restricted opening 41 in the valve member 38 and then into a passage 42. During normal engine operation, at or above its idling speed, the rate of fluid discharge from the pump 30 is of such magnitude that the pressure drop across the opening 41 is sufficient to hold the valve member 38 in engagement with its seat 40 against the spring 39. At lower engine speeds, for example, below 450 R. P. M., the spring 39 is effective to move the valve member 38 away from its seat 40 whereupon the downstream side of the opening 41 is placed in communication with a drain passage 43. Thus, the valve 38 may be termed a dump valve. The function of the valve member 38 will be more fully described hereinafter.

The passage 42 communicates with a passage 44 having a counterbore 45 communicating with one end of a hollow cylinder 46 within which a speed ratio control piston 48 is slidably mounted. The outer end of the counterbore 45 is closed by a plug 45'. The fluid pressure supplied to the cylinder 46 urges the control piston 48 against a suitable spring 50. The pump 30 and conduit 32 have only been schematically illustrated in the drawing. In an actual installation, the pump 30 was disposed within the housing of the transmission 24 and the pump was connected directly into the passage 35 through the rear of the housing 34.

As illustrated in Figure 4, the control piston 48 is connected to a speed-ratio control arm 51 of the transmission 24 by means hereinafter described. At this point, it is sufficient to state that motion of the piston against the spring 50 moves the control arm 51 to increase the speed ratio of the transmission. Similarly, return motion of the piston by the spring decreases the transmission speed ratio. Accordingly, in the case of progressively variable type transmissions, each position of the control piston 48 corresponds to a particular transmission speed ratio. The control piston 48 is movable between a stop sleeve 82 defining the maximum speed ratio position of the transmission and a stop pin 84 defining the minimum speed-ratio position of the transmission.

A pressure relief passage for the fluid supplied to the cylinder 46 is provided through the control piston 48 and comprises passages 52, 54 and 56, passage 56 being a lateral bore opening through a side of the piston. An orifice or jet member including a sleeve 58 is slidably fitted within the bore 56 and projects from the side of the piston into a slot 60, elongated in a direction parallel to the axis of the cylinder 46 and cut through the wall 62 of the cylinder. The sleeve 58 has a rectangular hollow head 64 fitted to the sides of the slot 60. A jet member 70, secured in the end of the head 64, is provided with a restricted sharp-edged orifice or metering slot 72 which is elongated across the head 64 at right angles to the axis of the cylinder 46.

With the construction so far described, the restricted orifice 72 comprises a pressure relief orifice for the output pressure of the pump 30. If the restricted orifice 72 always provided an opening of fixed size through which the fluid from the cylinder 46 could escape, then the fluid pressure acting on the control piston 48 would increase with increasing speed of the engine driven pump 30. That is, the speed ratio of the transmission 24 would vary with the speed of the pump 30. However, in accordance with the present invention, the relation between pump pressure and pump speed is varied by movement of the control piston 48. Thus, as the control piston 48 moves, the orifice 72 carried thereby moves along a longitudinal edge 74 of a metering bar 76, the position of which thereby controls the extent to which the orifice 72 is uncovered at each position of the control piston 48. A spring 59, within the bore 56, urges the outer surface of the orifice 72 toward engagement with the metering bar 76. This engagement may be controlled by a retainer plate 66 secured to the cylinder wall 62 by screws 68, the plate 66 overlying the lower edge of the head 64. The metering bar 76 is of channel-shaped cross section to reduce its mass to minimize inertia effects. The bar 76 is disposed within an external recess in the wall 62 of the cylinder 46, the bar 76 being slidably fitted between the flat bottom of the recess and a cover plate 80 therefor. The hydraulic fluid supplied by the pump 30 to the control piston 48 discharges through the orifice 72 into the recess 78 and drains therefrom through suitable passages (not shown). The long dimension of the orifice 72 extends across the longitudinal edge 74 of the metering bar 76 so that transverse location of the bar 76 controls the extent to which the orifice is uncovered thereby.

A flat spring 86 contacts the under side of the metering bar 76 intermediate its ends and urges the bar upward—as viewed in Figures 2 and 2A—against a pair of adjustable screws 88 and 90 respectively engaging the bar adjacent its opposite ends. The spring 86 is supported on a fulcrum or pivot pin 92 and its tension is adjustable by a screw 94. The maximum upward position of the ends of the bar 76 is thus determined by the adjusting screws 88 and 90 and one of the screws 88 enters a notch in the bar 76 to help locate the bar longitudinally. The ends of the screws 88, 90 and 94 are each accessible from the exterior of the housing 34 to permit their adjustment.

The adjusting screw 88 is disposed adjacent one end of the bar 76 such that, with the piston 48 and its orifice 72 in its extreme minimum ratio position—as illustrated in Figure 2—the point of engagement of the screw 88 with the bar is substantially in alinement with the orifice 72. The adjusting screw 90 is disposed adjacent the high speed ratio end of the bar 76. Thus, with the piston 48 in its minimum speed ratio position, the screw 88 may be adjusted to vary the extent to which the orifice 72 is uncovered whereby motion of the piston 48 against the spring 50 with increasing engine and pump speed can be initiated at any desired speed of the pump 30. Similarly (when the metering bar contacts the screw 90, as illustrated in Figure 2) adjustment of the screw 90 varies the extent to which the orifice 72 is uncovered when the piston 48 is at the high speed ratio end of its travel, thereby determining the engine and pump speed at which the piston 48 reaches this high speed ratio position. Obviously, the low speed ratio adjustment afforded by the adjusting screw 88 is independent of the high speed ratio adjustment afforded by the screw 90.

With the construction so far described, the adjustment of the screw 88 determines the engine speed at which the transmission shifts from its minimum speed ratio position and the adjustment of the screw 90 determines the engine speed and therefore the vehicle speed at which high speed ratio is obtained. After these adjustments have been made, the particular engine speeds at which the various intermediate speed ratios are obtained depends on the profile of the metering edge 74 as hereinafter described. In this way, the position or attitude of the bar 76 and the profile of its metering edge determines the size of the area of the orifice 72 at each position of the piston 48 thereby fixing the transmission speed ratio for each engine or pump speed.

The high speed ratio end of the metering bar 76 is also subject (in this embodiment) to control by a bellows 96, the interior of which is in communication with the engine intake manifold 14 through the conduit 33, and the exterior of which is exposed to atmospheric pressure. The lower end of the bellows 96 is sealed to a cover 98 fixed to the housing 34 and the upper or free end of the bellows is sealed to a plate 100 provided with a stop 102 extending within the bellows for engagement with the cover 98 of the bellows to limit contraction of the bellows in response to a low manifold pressure. A pull rod 104 is adjustably threaded into the upper bellows plate 100. This rod extends through a hole 106 in the metering bar adjacent its high speed ratio end. The rod 104 is also provided with a shoulder 108 which is adapted to engage and depress the high speed ratio end of the metering bar 76 against the spring 86, when the intake manifold vacuum pressure is low enough to contract the bellows 96, by exerting a force thereon sufficient to overcome the spring 86. Upon contraction of the bellows 96, the high speed ratio end of the metering bar 76 is depressed as illustrated in Figure 2A. The bellows rod 104 also extends into a bore 110 opening through an outer wall of the housing 34 thereby permitting adjustment of the rod 104 and its shoulder 108 relative to the metering bar 76 from the exterior of the housing 34.

As illustrated, the engine 10 is a non-supercharged engine. Accordingly, the engine manifold pressure is sub-atmospheric. When the throttle 16 is wide open, or substantially so, the intake manifold pressure is a maximum—that is, the manifold vacuum is a minimum—so that the bellows 96 is expanded and the shoulder 108 on the bellows rod 104 is disposed above the bar 76 in clearance relation thereto as best illustrated in Figure 2. The spring 86 then holds the high speed ratio end of the bar 76 upwardly against the adjusting screw 90. When the throttle 16 is only partly open, the low manifold pressure within the bellows 96 will cause the bellows to contract, thereby causing the shoulder 108 on the bellows rod 104 to engage the metering bar 76 to depress its high speed ratio end about the low speed ratio adjusting screw 88 as a pivot. The position of the high speed ratio end of the metering bar is then determined by the adjustment of the bellows pull rod 104 and by the extent of the bellows' contraction.

Note that the metering edge 74 of the bar 76 is not necessarily straight but may have relatively inclined portions 112 and 114 providing the edge 74 with a concave profile. Such a profile as compared to a straight profile reduces the rate of increase of the transmission speed ratio relative to the pump speed in the low speed ratio range, thereby reducing the rate of vehicle acceleration in this range. Obviously, the metering edge 74 may have any desired profile depending upon the desired performance characteristics, the particular transmission and the particular vehicle or other mass to which the transmission is drivably connected. However, for stability, it is desirable that the extent to which the orifice 72 is uncovered in each position of the piston be such that ever increasing pump speeds are essential to provide the necessary fluid pressure to move the piston, from its minimum speed-ratio position to its maximum speed-ratio position, against the spring 50.

As previously mentioned, this specific control device 28 has been designed for use in combination with a progressively variable transmission of the type illustrated in my aforementioned copending applications, wherein the control arm 51 is movable in one direction or the other from a zero speed-ratio position to respectively effect forward or reverse rotation of the output shaft at a speed ratio dependent on the magnitude of movement from said zero speed-ratio position. Accordingly, the connection between the control piston 48 and the control arm 51 now to be described is such that motion of the piston against its spring 50 may cause either forward or reverse shift movement of the control arm 51 from its zero speed-ratio position. Viz: the piston 48 is provided with a pair of racks 116 and 118 extending therefrom parallel to the piston axis. As illustrated, the spring 50, against which the piston 48 moves, is disposed between the head end 122 of the sleeve 82 and a ring 120 abutting the ends of the racks 116 and 118.

The racks 116 and 118 are so arranged that a pinion 124 may be shifted along an axis transverse to the piston axis from a first position in which the bottom teeth of the pinion are in meshing engagement with the rack 116, to a second position illustrated in Figure 4 in which the top teeth of the pinion are in meshing engagement with the rack 118. The pinion 124 is splined at 126 to a control shaft 128 for said axial shift movement therealong. The shaft 128 is provided with a crankarm 130 and a crank pin 132 journaled at the outer end of the crankarm has a tongue 134 engageable with a slot in the speed-ratio control arm 51 of the transmission. The opposite end of the control shaft 128 may be connected to means (not shown) for indicating the speed-ratio of the transmission or to a control handle (not shown) by means of which the automatic motion of the piston 48 can be manually modified or over-ridden.

The arrangement is such that with the control piston 48 against the stop pin 84, the control arm 51 is in its zero speed-ratio position. Then, with the pinion 124 in engagement with the rack 116, motion of the piston 48 causes speed-ratio shift movement of the control arm 51—for forward drive—and with the pinion 124 in engagement with the rack 118, motion of the piston 48 causes speed-ratio shift movement of the control arm 51 in the opposite direction for the reverse drive. With this construction, when the pinion 124 is in engagement with rack 116, the device 28 automatically controls the speed ratio of the transmission for forward drive and when the pinion 124 is in engagement with the rack 118, the device 28 automatically controls the speed ratio of the transmission for reverse drive.

The pinion 124 has a hub portion 136 having an annular groove 138 and a control shaft 140 has a crankpin 142 extending within the groove 138 such that rotation of the shaft 140 is operative to axially shift the pinion 124. The shaft 140 has a handle or arm 144 secured thereto and in the position illustrated, the arm 144 and pinion 124 are in their reverse drive position. A spring 146 may serve to urge the pinion 124 to its forward drive position. A manual connection (not shown) to the lever 144 is provided to effect the shift from forward to reverse and vice versa.

The stop pin 84 limits the travel of the piston 48 at the zero speed-ratio end of its stroke and this pin 84 is adjusted so that when the piston 48 abuts thereagainst, the teeth of the pinion 124 are alined with the spaces between the teeth on racks 116 and 118. With this arrangement, the pinion 124 may be freely moved from one rack to the other only while the piston 48 is against the stop 84. The rotative position of the shaft 140 and its crankpin 142 is set or designed so that the transmission is then in its zero speed-ratio position. As soon as the piston 48 moves away from the stop pin 84, this tooth alinement is destroyed, whereby movement of the pinion 124 from one rack to the other is prevented as is desirable in order to prevent the operator from shifting from forward to reverse or vice versa except when the transmission is in zero speed ratio. However, as the piston 48 continues to move, this tooth alinement is periodically re-established. Accordingly, to prevent the operator from shifting from forward to reverse or vice versa except at zero speed ratio, a blocking plate 148 is secured to the piston 48. The plate 148 has a pair of fingers 150 and 152 which extend alongside of the racks 116 and 118 respectively to prevent shifting of the pinion 124 from one rack to the other. Fingers 150 and 152 are profiled so that the pinion 124 can be shifted from one rack to the other only at the zero speed-ratio position of the piston 48. In this way, a shift from forward to reverse or vice versa is prevented by the plate 148 except when the piston 48 is in its minimum or zero speed ratio position.

The teeth of the pinion 124 have a width sufficient to engage both racks 116 and 118. Accordingly, when the piston 48 is in its zero speed-ratio position, the pinion 124 may be moved to an intermediate position engaging both racks 116 and 118. In this intermediate position of the pinion 124, the control piston 48 and the transmission control arm 51 are both locked against movement from their zero speed-ratio positions. In this intermediate position of the pinion 124, the engine may be accelerated without changing its speed ratio. This in effect keeps the transmission in neutral.

With the aforedescribed double rack and pinion connection between the control piston 48 and the control shaft 128, motion of the piston 48 from its zero speed-ratio position can effect either forward or reverse movement of the control shaft 128. Accordingly, the control device 28 controls the transmission speed ratio in the same manner for both forward or reverse vehicle operation. Obviously, however, if the control device were used with a transmission having a shiftable clutch or gearing arrangement to provide forward or reverse drive, then the double rack 116, 118 and shiftable pinion construction would be dispensed with and instead the control piston would be connected to the control shaft 128 without the relatively reversible provisions provided by the racks 116 and 118.

The operation of the control device 28 can be conveniently described by setting forth the sequence by which its various adjustments are set. Assuming that the control device 28 is used in conjunction with a progressively variable transmission wherein the transmission speed-ratio range extends down to zero such as disclosed in my aforementioned co-pending application. Further assuming that the highest speed ratio provides an overdrive—that is, a greater than a 1:1 speed ratio—and that the desired forward drive performance characteristics are:

(a) the transmission shall always be in zero speed ratio when the engine is idling—that is, at the minimum speed of the control pump 30;

(b) that the control piston shall start to move from its zero speed-ratio position when the engine speed exceeds say 650 R. P. M.;

(c) that under low-throttle operation, the control piston shall reach the maximum speed ratio (overdrive) at an engine speed of say 850 R. P. M. which may correspond to a vehicle speed of approximately 30 miles per hour;

(d) that at full-throttle operation, the control piston shall pass through 1:1 speed ratio at an engine speed of say 3,000 R. P. M. which may correspond to a vehicle speed of approximately 65 to 70 miles per hour.

The aforementioned performance characteristics are cited merely by way of example. The actual characteristic selected obviously will vary according to the speed range and size of the engine, size and type of vehicle or other mass being driven, and with the preferences of individual operators.

At assembly, the control piston stop 84 and the connection between the control piston 48 and the transmission control arm 51 are adjusted so that when the piston is against the stop 84, the transmission is in zero speed ratio and the pinion 124 is freely slidable from either of the racks 116 or 118 to the other. A preliminary adjustment of the low speed ratio adjusting screw 88 and the high speed ratio adjusting screw 90 is now made so that the metering bar 76 is substantially horizontal and approximately one half of the orifice 72 is uncovered when the control piston 48 is against the stop 84. Then, the spring adjusting screw 94 is adjusted so that a load of, for example, 2 lbs. is required to be exerted by the bellows rod 104 to depress the metering bar 76 away from the high-speed ratio adjusting screw 90.

The engine is now started and adjusted to idle at a speed of, for example, 450 R. P. M. Then, the engine throttle 16 is partly opened to effect an increase in engine speed to 650 R. P. M. and the low speed ratio adjusting screw 88 is adjusted until the piston 48 starts to move out of the zero speed-ratio position at this engine speed. Next, with substantially no load on the engine, the throttle 16 is adjusted to provide an increase in the engine speed to approximately 850 R. P. M. Under the foregoing conditions, the engine intake manifold pressure is low and therefore the bellows 96 is contracted and the bellows rod 104 is effective to lower the high speed-ratio end of the metering bar 76. The bellows rod 104 is then adjusted so that the transmission reaches its extreme high speed ratio (overdrive) at this engine speed of 850 R. P. M. Thus, the adjustment of the bellows rod 104 determines the relatively low engine speed at which the transmission is shifted into its highest speed ratio when the throttle 16 is only partly opened—that is, for a relatively gentle start. With the transmission in high speed ratio, an engine speed of 850 R. P. M. may correspond to a vehicle speed of approximately 30 miles per hour.

The engine throttle 16 is now opened wide so that the intake manifold pressure increases and the bellows 96 expands, thereby permitting the spring 86 to move the metering bar 76 up against the high speed ratio adjusting screw 90. The screw 90 is now adjusted so that the control piston 48 passes through 1:1 speed ratio when the engine speed reaches approximately 3,000 R. P. M. which, at this speed ratio, may correspond to a vehicle speed of 65 to 70 miles per hour.

The above adjustments having been made, the spring 86 preferably is now adjusted so that the bellows remains contracted until nearly maximum manifold pressure is reached. This adjustment of the spring 86 may be effected by cruising, for example, at 40 miles per hour and then opening the throttle wide and, during such operation, setting the spring adjustment screw 94 to the minimum spring pressure that will give consistent bellows expansion and down shift each time the throttle is thus opened wide.

Upon expansion of the bellows 96 the spring 86 raises the metering bar 76 against the stop 90 to increase the extent to which the orifice 72 is uncovered, whereupon the hydraulic pressure acting against the piston 48 decreases and the piston shifts to a lower speed ratio position. Therefore, with the aforedescribed adjustment of the spring 86, the transmission will remain in overdrive when more power is called for until maximum engine torque is called for by the driver whereupon the transmission will shift to a lower speed ratio. This spring adjustment makes for good fuel economy since it provides minimum engine turns per mile until the operator calls for maximum power by opening the throttle wide, whereupon the control piston 48 will move toward a lower speed ratio and the engine will accelerate to develop the increased power demanded.

Summarizing—with this construction, the operator can control the rate of vehicle acceleration by his manipulation of the vehicle throttle. If a gentle start is desired, the throttle is only partly opened, whereupon the low manifold pressure results in complete contraction of the bellows 96, thereby pulling down the high speed ratio end of the metering bar 76. Under these conditions, only a relatively small area of the orifice 72 is uncovered and, therefore, the control piston 48 will reach its highest ratio position at relatively low engine speeds and, therefore, at relatively low vehicle speeds. For maximum vehicle performance or acceleration, the throttle is fully opened, whereupon the manifold pressure will be a maximum and the bellows 96 will expand and permit the spring 86 to hold the high speed-ratio end of the metering bar up against the high-speed adjusting screw 90, thereby uncovering a relatively large area of the orifice 72. Accordingly, a relatively high engine speed, and therefore vehicle speed, is now needed to provide the pump pressure necessary to move the control piston 48 to its high speed-ratio position.

Intermediate rates of speed-ratio change with engine speed may be obtained by a part-throttle opening sufficient to effect an intermediate value of the intake manifold pressure such that the bellows 96 is only partly contracted. The adjustment of the spring 86 determines the extent to which the throttle must be opened before the bellows 96 starts to expand. However, as previously described, it may be desirable that the bellows 96 remain fully contracted to hold the metering bar 76 down away from the adjusting screw 90 until almost maximum intake manifold pressure is obtained. With this adjustment of the spring 86, a relatively gentle vehicle start—that is, a completion of the shift into the highest speed ratio at relatively low vehicle speeds—will be obtained unless the throttle is opened sufficiently to give almost maximum intake manifold pressure, and therefore, maximum engine torque.

The design of the control device 28 is such that should the bar 76 completely close the orifice 72, the pressure output of the pump 30, even at low pump speeds, would force the control piston 48 against its spring 59 to the extreme limit of its travel as determined by the stop sleeve 82. That is, the piston 48 would move to a position corresponding to the maximum speed ratio of the transmission. If the metering bar 76 should completely uncover the orifice 72, the pump 30, even at high pump speeds would then be incapable of maintaining any substantial pressure against the control piston 48 and, accordingly, the spring 59 would hold the control piston against the stop pin 84 at the opposed limit of its travel. That is, the piston 48 would be limited to its minimum speed-ratio position. This design provides a wide range of adjustment such that control device 28 may readily be pre-set to provide any desired relation between engine manifold pressure (engine torque), vehicle or engine speed, and the transmission speed ratio.

When the vehicle brakes are applied suddenly, it is essential that the fluid pressure acting on the control piston decrease sufficiently fast that the transmission is brought back to its zero speed ratio by the time that the vehicle is brought to rest. If the transmission is not at its zero speed ratio when the vehicle is being held at rest, the engine will stall. To prevent this possibility, the previously described "dump" valve member 38 has been provided. When the engine speed falls below its idling speed, to say 450 R. P. M., the pressure drop across the valve opening 41 decreases to the point where the spring 39 is effective to move the valve member 38 away from the seat 40. When this happens, the control piston cylinder 46 is placed in communication with the drain passage 43 thereby quickly relieving the control piston 48 of pressure so that the control piston quickly moves to its zero speed ratio position. Whenever the engine speed exceeds this 450 R. P. M., the pressure drop across the restricted opening 41 holds the valve member 38 in engagement with its seat 40 thereby closing the drain passage 43. The fluid delivered by the pump 30 then flows to the control piston 48 and through its restricted orifice 72 so that the control device 28 operates as previously described.

The orifice 72 preferably is a sharp-edged orifice—that is, its minimum dimension transverse to the flow therethrough is large compared to its length or thickness in the direction of the flow. With such an orifice, the resistance offered to the flow of oil or other liquid therethrough is substantially independent of the viscosity of the oil. Accordingly, changes in the viscosity of the oil resulting from changes in its temperature have little effect on the operation of the control device 28 as far as the resistance offered by the orifice 72 is concerned. However, when the viscosity of the oil increases, the inherent leakage or back flow through the pump 30 decreases with the result that the pump output pressure increases. In addition, the pressure drop from the pump to the control piston increases with increase in viscosity of the oil, but this latter effect is small compared to the change in the pump output pressure, particularly when the oil flow path between the pump 30 and the control piston 48 is short as in applicant's construction.

As illustrated the cross-section of the orifice 72 is rectangular. Obviously however, the orifice 72 may have a cross-section of some other shape.

In order to compensate for the increase in the pump output oil pressure with increase in the oil viscosity, the oil passage 42 is provided with a by-pass passage 153 communicating with a bleed port 154 through which a needle-like valve stem 155 is slidable. The valve stem 155 is adjustably threaded to a bellows 156 providing a flexible end wall for a casing 157 containing a fluid—such as kerosene—having a suitable temperature co-efficient of expansion. The casing 157 is adjustably secured to the housing 34 by a threaded stem 158 and a spring 159. Also, the arrangement is such that the oil flowing out through the orifice 72 drains over the casing 157 whereby the bellows 156 is responsive to the temperature of the oil delivered by the pump 30.

With this thermostatic needle valve, if the temperature of the oil increases, the valve 155 closes to decrease the effective size of the bleed opening 154 and vice versa. The profile of the needle valve 155 is designed so that the valve automatically adjusts the oil leakage through the bleed opening 154 to compensate for changes in the back leakage through the pump with changes in oil temperature. For example, upon an increase in the temperature of the oil, the needle valve moves in a valve closing direction to decrease the oil leakage through the bleed opening 154 to compensate for the resulting increase in the back leakage of oil through the pump.

In the aforedescribed structure, the control piston 48 is mechanically connected to the transmission speed-ratio control arm 51. However, if the force required to move the control arm 51 is large, it is within the scope of this invention to interpose a conventional servo-motor unit between the control piston 48 and the control arm 51.

Figure 8:
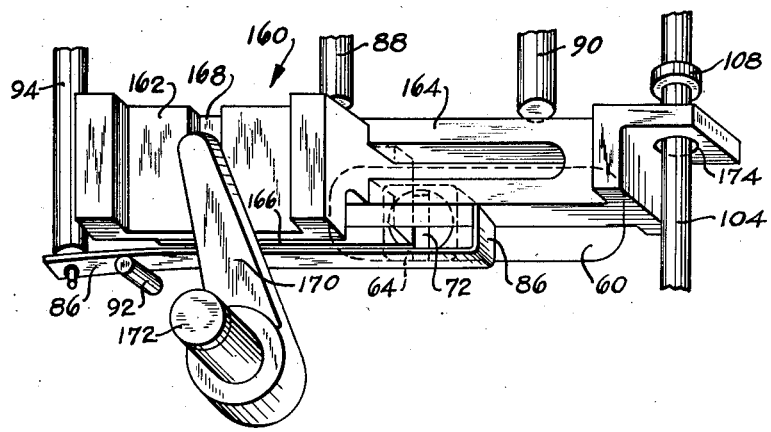
Figure 8 is a perspective view illustrating a modified form of metering bar.

Figure 8 illustrates a modification of the control device 28 which, except for details of the metering bar, is similar to the control device 28. Accordingly, similar parts have been designated by similar reference numerals. The purpose of this modification is to enable the operator to reduce the transmission speed ratio in going down hill, because under such conditions the control device 28, previously described, would automatically shift into high speed ratio.

In Figure 8, the metering bar 160 comprises two telescopic portions 162 and 164 instead of a single rigid piece. The bottom edge 166 of the metering bar portion 162 comprises the metering edge along which the restricted orifice 72 travels. For simplicity, the metering edge 166 has been illustrated as straight. The adjusting screws 88 and 90 engage the metering bar portion 164 and the metering bar portion 162 is positioned relative to the portion 164 by a crankarm 170 having a crankpin extending into a channel 168 in the portion 162. The crankarm 170 is carried by a shaft 172 whereby the rotative position of the shaft 172 longitudinally locates the metering bar portion 162 relative to the metering bar portion 164. The spring 86 engages the metering bar portion 164 to urge the composite metering bar 160 up against the adjusting screws 88 and 90. Also, the metering bar portion 164 has an opening 174 through which extends the rod 104 of the bellows 96, the shoulder 108 on the rod 104 being arranged to depress the high speed-ratio end of the composite metering bar 160 upon contraction of the bellows 96.

With this construction for any one position of the crankarm 170, the composite metering bar 160 operates as a single piece bar in a manner similar to the metering bar 76. However, by rotating the crankarm 170 in a counterclockwise direction, the metering bar portion 162 is shifted to the left to the position illustrated in Figure 8. In this position of the metering bar portion 162, the restricted orifice 72 can move only so far beyond the end of the metering bar portion 162 as to uncover the orifice 72, whereupon the pump 30 is incapable of moving the control piston 48 and its orifice 72 beyond this position. In this way, counterclockwise movement of the crankarm 170 limits or reduces the extent to which the pump 30 is capable of moving the control piston 48 to increase the transmission speed ratio. Accordingly, the operator can reduce the speed ratio of the transmission to any desired value by moving the metering bar portion 162 to the left to the desired extent, thereby over-riding the automatic control. Also, with the composite metering bar 160 of Figure 8, by moving the metering bar portion 162 to its extreme leftward position, the operator can then speed up the engine while the vehicle is parked, without automatically shifting out of zero speed ratio.

The control device 28 has been described in connection with a progressively variable transmission of the type disclosed in my aforementioned applications. However, the invention obviously is applicable to other types of progressively variable transmissions. In fact, as previously mentioned, the invention can also be used in connection with stepped-types of multi-speed transmissions—for example, such as disclosed in my co-pending application Serial No. 462,059, now Patent No. 2,400,536, issued May 21, 1946. In a stepped-type of transmission, the speed ratio control lever must move in a series of jumps from one speed ratio position to the next. Therefore, in applying the control device 28 to a stepped-type of transmission, a yielding connection, illustrated in Figure 9, is provided between the control piston and the transmission speed-ratio control arm instead of the rigid connection previously described for a transmission having a progressively variable speed ratio.

In Figure 9, a control device 180 essentially is similar to the control device 28, particularly as illustrated in Figure 6, except for the connection between its control piston 182 and the transmission speed-ratio control shaft 184. As in the control device 28, the control piston 182 is slidable in a cylinder 186 and fluid pressure from an engine driven pump acts against one end of the piston to urge the piston against a spring 188. The fluid escapes or bleeds through passages 190 and 192 having a metering orifice 194 disposed in a slot 196 in the wall 198 of the cylinder 186. The size of the orifice 194 is controlled by a metering bar 200 which is urged against a pair of adjusting screws 202 and 204 by a spring 206. The high speed-ratio end of the metering bar is adapted to be depressed by a bellows rod 208 under the control of the engine intake manifold pressure. The construction and operation of the orifice 194, control piston 182 and the metering bar 200 essentially are the same as in the control device 28 and therefore, further description of these parts of the control device 180 appears to be unnecessary.

The control piston 182 is slidably connected to a piston rod 210 which has a reduced diameter portion 212 extending through a counterbore 214 within the piston 182. The counterbore 214 and reduced diameter portion 212 define shoulders 216 and 218 on the piston and piston rod respectively against which a washer 220 is urged by a spring 222. The opposite end of the spring 222 presses against a second washer 224 which is adapted to engage shoulders 226 and 228 provided by members 230 and 232 threadably secured to the piston and piston rod respectively.

The piston rod 210 is provided with a suitable push-pull connection 234 with an arm 236 rotationally rigid with the speed-ratio control shaft 184. The arm 236 and shaft 184 are also provided with a quadrant 238 having notches 240 angularly spaced in accordance with the stepped speed-ratio positions of the control shaft 184. The notches 240 may be arranged for successive engagement by a spring pressed detent so that before any movement of the control shaft takes place, a force must be applied thereto sufficient to overcome the resistance offered by this spring pressed detent.

Figure 9 also illustrates a novel form of spring-pressed detent comprising a star wheel 242 rotatively mounted on a lever 244 pivoted in a pin 246 eccentrically carried by a plug or shaft 247. A spring 248 acts against the lever 244 to urge the star wheel into engagement with the notches 240. The star wheel is constructed so that two of its adjacent arms are normally in adjacent notches on the quadrant 238. The eccentrically mounted pin 246 permits adjustment of the position of the star wheel so that the latched positions of the quadrant correspond to speed-ratio positions of the speed-ratio control shaft 184.

With this construction, as the control piston 182 moves against the spring 188 from its position illustrated in Figure 9, the control shaft 184 and piston rod 210 first remain stationary, whereupon the piston 182 carries the washer 220 with it to compress the spring 22, the piston shoulder 226 moving away from the washer 224. As soon as the force of the spring 222, acting against the piston rod 210 through the washer 224 and shoulder 228, is sufficient to overcome the resistance offered by the star wheel 242, the control arm 236 and quadrant 238 are snapped one increment to the second speed-ratio position. The control arm 236 and quadrant 238 snap quickly since the resistance of the star wheel decreases as soon as the quadrant starts to move. The star wheel now engages the second and third notches in the quadrant 238 and the spring 222 is returned to the position illustrated in Figure 9 relative to the piston 182 and piston rod 210. The star wheel 242 now latches the control shaft 184 in this position until the control piston 182 again compresses the spring 222 sufficiently to snap the quadrant 238 a second increment. In this way, the control shaft 184 moves in a series of jumps corresponding to its speed-ratio positions although the control piston 182 moves smoothly against or by the spring 188. As illustrated, a floating sleeve 250 is also disposed between the washers 220 and 224 to insure positive movement of the piston rod 210 by the piston 182 if the piston rod does not snap to its next position before the piston has moved one shift increment—i. e., a distance equal to the difference between the maximum distance between facing sides of the washers 220 and 224 and the length of the sleeve 250.

With a stepped transmission, the minimum speed-ratio position of the control piston may correspond to the first speed of the transmission, in which case the control pump need not be driven from the engine ahead of the transmission as illustrated in Figure 1, but may be driven from the engine at any speed afforded by the transmission—that is, from any of the operating parts of the transmission. Also, with such a stepped transmission, some sort of releasable coupling or clutch—e. g., the conventional clutch or hydraulic coupling—is necessary between the engine 10 and the transmission 24 to permit the engine to idle while the vehicle is parked.

The adjustment effects in the control device 180 are slightly different from the aforedescribed adjustment of the control device 28. For a gentle start, the engine throttle is partly opened and the low speed-ratio adjusting screw 202 is set so that shift from first to second occurs at a vehicle speed of say seven miles per hour. Then, with this small throttle opening, a bellows rod 208 is adjusted so that the shift into the highest speed ratio occurs at say 30 miles per hour. At full throttle operation, the high speed-ratio adjusting screw 204 is set so that shift into the high speed ratio occurs at say 70 miles per hour. Lastly, the spring 206 is adjusted as described in connection with the control device 28.

Instead of automatically controlling the attitude of the metering bar 76 in response to changes in the engine intake manifold pressure, the attitude of this bar may be controlled by a mechanical connection to the engine throttle 16. Such a modification is illustrated in Figures 10 to 12.

In Figures 10 to 12, the manifold pressure responsive bellows 96 is replaced by a cam follower member 260 to which the rod 104 is adjustably and threadedly secured. The lower end of the follower member 260 is urged into engagement with a cam 262 by a spring 264 having a strength sufficient to overcome the spring 86. As illustrated, the cam 262 comprises a sector formed on a cylinder 266 having a shaft 268 extending therefrom to which an arm 270 is secured—for example, by a set screw 272. The arm 270 is connected to the engine throttle 16 by means schematically indicated at 274 so that the cam 262 rotates with the movement of the throttle 16.

The arrangement is such that, when the throttle is closed (Figure 10), the cam face 276 is substantially horizontal and is engaged by the bottom of the cam follower 260. As the throttle is opened against a spring 277, the cam 262 rotates counterclockwise and, when the throttle is fully open or substantially fully open, the cam face 278 is horizontal and engages the cam follower. During this cam movement, there is no movement of the cam follower. The connection schematically indicated at 280, between the usual accelerator pedal 282 and the throttle 16, includes resilient means 284 permitting overtravel of the accelerator pedal beyond its full throttle position with the throttle valve remaining fully or substantially fully open. This overtravel movement of the accelerator pedal 282 rotates the cam 262 to the position illustrated in Figure 11 thereby raising the cam follower 260 and the shoulder 108 on the rod 104. Thereupon, the spring 86 tilts the metering bar 76 against the stop 90 whereby the extent to which the orifice 72 is uncovered is increased and the transmission speed ratio is reduced.

With the structure of Figures 10 to 12 so far described, particularly in the case of a progressively variable speed-ratio transmission, if the accelerator pedal 282 should suddenly be released from its overtravel position to a closed or partly closed throttle position, the cam follower 260 would drop down and quickly reduce the extent to which the orifice 72 is uncovered. As a result, the transmission speed ratio might increase so fast that the vehicle speed actually would temporarily increase, in spite of the fact the accelerator pedal had been released. Generally, this result is objectionable and may be overcome by retarding downward movement of the cam follower 260.

As illustrated, the cam follower 260 is disposed in a chamber 286 into which the oil drains from the metering bar chamber 78. The chamber 286 is in communication with a closed chamber 288 below the cam follower 260 through a passage 290 having a spring-urged check valve 292 arranged to prevent flow from the chamber 288 to the chamber 286 except through a restricted opening 294. With this construction, the chamber 288 quickly fills with oil from the chamber 286 even though the cam follower 260 is only raised for a short length of time. However, when the accelerator pedal 282 is released from its overtravel position, the cam follower spring 264 is incapable of quickly lowering the cam follower because the oil below the cam follower in the chamber 288 must be displaced upwardly through a restricted opening 294. As a result, the transmission speed ratio only increases slowly when the accelerator pedal is suddenly released from its overtravel position and therefore the vehicle immediately slows down.

The remaining structure of Figures 10 to 12 preferably is similar to that illustrated in Figures 2 to 7 and, in addition, may include the features of Figure 8 and/or the features of Figure 9.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination, a fluid motor having a piston movable with changes in the pressure of a fluid, means providing a sharp-edged pressure-relief orifice for said fluid, a member having an edge so arranged that movement of said piston effects relative movement of said orifice and edge to vary the effective size of said orifice, and means for independently adjusting the position of the ends of said member for varying the relationship between the piston position and the effective size of said orifice.

2. In combination, a fluid motor having a piston movable with changes in the pressure of a fluid, means movable with said piston and providing a pressure relief orifice for said fluid, a member having an edge along which said orifice is arranged to move for controlling the extent to which said orifice is uncovered, a pair of adjustable stops engaging said member adjacent the ends of the path of travel of said orifice, and spring means for urging said member against said stops.

3. In combination, a fluid motor having a piston movable with changes in the pressure of a fluid, means movable with said piston and providing a pressure relief orifice for said fluid, a member having an edge along which said orifice is arranged to move for controlling the extent to which said orifice is uncovered, and means for changing the attitude of said edge relative to the path of travel of said orifice.

4. In combination, a fluid motor having a piston movable with changes in the pressure of a fluid, means movable with said piston and providing a sharp-edged pressure-relief orifice for said fluid, said orifice being elongated transverse to its path of movement, and a member having a flat side adjacent said orifice and along which said orifice moves, said flat side having an edge substantially transverse to the long dimension of said orifice for controlling the extent to which said orifice uncovered as said orifice moves along said side.

5. In combination, an engine, a multi-speed transmission drivably connected to said engine, a pump drivably connected to said engine, a fluid motor having a piston movable with changes in the output pressure of said pump for varying the transmission speed ratio, means providing a pressure relief orifice for the output fluid of said pump, and valve means adapted to vary the effective size of said orifice, one of said pressure relief orifice means and valve means being connected to said piston for movement therewith relative to the other of said means for varying the effective size of said orifice in response to movements of said piston.

6. In combination, an engine having means operable to control its power output, a multi-speed transmission drivably connected to said engine, a pump drivably connected to said engine, a fluid motor having a piston movable to vary the transmission speed ratio and urged in a speed-ratio-increasing direction by the output fluid pressure of said pump, means for urging said piston in the opposite direction against said pressure, means providing a pressure relief orifice for the output fluid of said pump, and valve means adapted to vary the effective size of said orifice, one of said pressure relief orifice means and valve means being connected to said piston for movement therewith relative to the other of said means for varying the effective size of said orifice in response to movements of said piston.

7. In combination, an engine having means operable to control its power output, a multi-speed transmission drivably connected to said engine, a pump drivably connected to said engine, a fluid motor having a piston movable to vary the transmission speed ratio and urged in a speed-ratio-increasing direction by the output fluid pressure of said pump, means for urging said piston in the opposite direction against said pressure, means providing a pressure relief orifice for the output fluid of said pump, means adapted to vary the effective size of said orifice in response to movements of said piston, and means movable to limit the maximum value of said pressure thereby limiting the maximum speed ratio of the transmission.

8. In combination, an engine having means operable to control its power output, a multi-speed transmission drivably connected to said engine, a pump drivably connected to said engine, a fluid motor having a piston movable to vary the transmission speed ratio and urged in a speed-ratio-increasing direction by the output fluid pressure of said pump, means for urging said piston in the opposite direction against said pressure, means providing a pressure relief orifice for the output fluid of said pump, means to vary the effective size of said orifice in response to movements of said piston, and means automatically operative to relieve the fluid pressure acting against said piston when the engine speed is below a predetermined value.

9. In combination, an engine, a multi-speed transmission drivably connected to said engine, a pump drivably connected to said engine, a fluid motor having a piston movable with changes in the output fluid pressure of said pump for varying the transmission speed ratio, means movable with said piston and providing a pressure relief orifice for said fluid, and a member having an edge along which said orifice is arranged to move for controlling the extent to which said orifice is uncovered by said member in response to speed ratio shift movements of said piston.

10. In combination, an engine, a multi-speed transmission drivably connected to said engine, a pump drivably connected to said engine, a fluid motor having a piston movable with changes in the output fluid pressure of said pump for varying the transmission speed ratio, means movable with said piston and providing a pressure relief orifice for said fluid, a member having an edge along which said orifice is arranged to move for controlling the extent to which said orifice is uncovered by said member, and means for changing the attitude of said edge relative to the path of travel of said orifice.

11. In combination, an engine having means operable to control its power output, a multi-speed transmission drivably connected to said engine, a pump drivably connected to said engine, a fluid motor having a piston movable to vary the transmission speed ratio and urged in a speed-ratio-increasing direction by the output pressure of said pump, means for urging said piston against said pressure, means movable with said piston and providing a pressure relief orifice for the output fluid of said pump, and a member having an edge along which said orifice is arranged to move for controlling the extent to which said orifice is uncovered by said member in response to speed ratio shift movements of said piston.

12. In combination, an engine having means operable to control its power output, a multi-speed transmission drivably connected to said engine, a pump drivably connected to said engine, a fluid motor having a piston movable to vary the transmission speed ratio and urged in a speed-ratio-increasing direction by the output pressure of said pump, means for urging said piston against said pressure, means movable with said piston and providing a pressure relief orifice for the output fluid of said pump, a member having an edge along which said orifice is arranged to move for controlling the extent to which said orifice is uncovered by said member, and means dependent on the operation of said first-mentioned means for varying the attitude of said edge relative to the path of travel of said orifice.

13. In combination, an engine having means operable to control its power output, a multi-speed transmission drivably connected to said engine, a pump drivably connected to said engine, a fluid motor having a piston movable to vary the transmission speed ratio and urged in a speed-ratio-increasing direction by the output pressure of said pump, means for urging said piston against said pressure, means movable with with said piston and providing a pressure relief orifice for the output fluid of said pump, a member having an edge along which said orifice is arranged to move for controlling the extent to which said orifice is uncovered by said member, and means automatically operative upon movement of said first-mentioned means to a substantially maximum power position for tilting said edge so as to increase the extent to which said orifice is uncovered when said orifice is in its high-speed-ratio range.

14. In combination, an engine having means operable to control its power output, a multi-speed transmission drivably connected to said engine, a pump drivably connected to said engine, a fluid motor having a piston movable to vary the transmission speed ratio and urged in a speed-ratio-increasing direction by the output pressure of said pump, means for urging said piston against said pressure, means movable with said piston and providing a pressure relief orifice for the output fluid of said pump, a member having an edge along which said orifice is arranged to move for controlling the extent to which said orifice is uncovered by said member, and means automatically operative at a high engine manifold pressure for tilting said edge so as to increase the extent to which said orifice is uncovered when said orifice is in its high-speed-ratio range.

15. In combination, an engine having means operable to control its power output, a multi-speed transmission drivably connected to said engine, a pump drivably connected to said engine, a fluid motor having a piston movable to vary the transmission speed ratio and urged in a speed-ratio-increasing direction by the output pressure of said pump, means for urging said piston against said pressure, means movable with said piston and providing a pressure relief orifice for the output fluid of said pump, a member having an edge along which said orifice is arranged to move for controlling the extent to which said orifice is uncovered by said member, and means operable to move said member along a path substantially parallel to the path of travel of said orifice to completely uncover said orifice at least in its high-speed-ratio range.

16. In combination, an engine having means operable to control its power output, a multi-speed transmission drivably connected to said engine, a pump drivably connected to said engine, a fluid motor having a piston movable to vary the transmission speed ratio and urged in a speed-ratio-increasing direction by the output pressure of said pump, means for urging said piston against said pressure, means movable with said piston and providing a pressure relief orifice for the output fluid of said pump, a member having an edge along which said orifice is arranged to move for controlling the extent to which said orifice is uncovered by said member, a pair of stops engaging said member adjacent the ends of the path of travel of said orifice, spring means for urging said member against said stops, and means for tilting said member against said spring means about the stop adjacent the minimum-speed-ratio position of said orifice.

17. In combination, an engine, a stepped multi-speed transmission drivably connected to said engine and having a speed-ratio shift member, yieldable latch means defining the speed ratio positions of said member, a fluid motor having a piston, means including resilient means connecting said piston to said shift member, and a pump drivably connected to said engine and arranged to provide a fluid pressure for urging said piston and therefore said shift member in a speed-ratio-increasing direction, said connecting means including relatively non-yieldable means operative to positively move said shift member after said yieldable means yields to an extent corresponding to spacing of the speed ratio positions of said member.

18. In a transmission having a speed ratio shift member movable in one direction from a zero-speed-ratio position for increasing the transmission speed ratio for forward drive and movable in the opposite direction from said zero-speed-ratio posiiton for increasing the transmission speed ratio for reverse drive, and speed-ratio control means for said transmission including a second member, and means operatively connecting said shift and second members so that movement of said second member effects speed ratio shift movement of said shift member, said connection including means movable to reverse the relative movement of said members.

19. In a transmission having a speed ratio shift member movable in one direction from a zero-speed-ratio position for increasing the transmission speed ratio for forward drive and movable in the opposite direction from said zero-speed-ratio position for increasing the transmission speed ratio for reverse drive, speed-ratio control means for said transmission including a second member, means operatively connecting said shift and second members so that movement of said second member effects speed ratio shift movement of said shift member, said connection including means movable to reverse the relative movement of said members, and means to prevent said movement of said last-mentioned means except when said first-mentioned member is in its zero speed-ratio position.

20. In a transmission having a speed ratio shift member movable in one direction from a zero-speed-ratio position for increasing the transmission speed ratio for forward drive and movable in the opposite direction from said zero-speed-ratio position for increasing the transmission speed ratio for reverse drive, and speed-ratio control means for said transmission including a second member, means operatively connecting said shift and second members so that movement of said second member effects speed ratio shift movement of said shift member, said connection comprising a pair of toothed elements operatively connected to one of said members and a gear operatively connected to the other of said members, said gear being movable to engage one or the other of said toothed elements to reverse relative movement of said members.

21. In a transmission having a speed ratio shift member movable in one direction from a zero-speed-ratio position for increasing the transmission speed ratio for forward drive and movable in the opposite direction from said zero-speed-ratio position for increasing the transmission speed ratio for reverse drive, and speed-ratio control means for said transmission including a second member, means operatively connecting said shift and second members so that movement of said second member effects speed ratio shift movement of said shift member, said connection comprising a pair of racks operatively connected to one of said members and a gear operatively connected to the other of said members, said gear being axially movable to engage one or the other of said racks to reverse relative movement of said members.

22. In a transmission having a speed ratio shift member movable in one direction from a zero-speed-ratio position for increasing the transmission speed ratio for forward drive and movable in the opposite direction from said zero-speed-ratio position for increasing the transmission speed ratio for reverse drive, and speed-ratio control means for said transmission including a second member, means operatively connecting said shift and second members so that movement of said second member effects speed ratio shift movement of said shift member, said connection comprising a pair of racks operatively connected to one of said members and a gear operatively connected to the other of said members, said gear being axially movable to engage one or the other of said racks to reverse relative movement of said members, said gear also being movable to an intermediate position engaging both said racks thereby locking said members against relative movement.

23. In a transmission having a speed ratio shift member movable in one direction from a zero-speed-ratio position for increasing the transmission speed ratio for forward drive and movable in the opposite direction from said zero-speed-ratio position for increasing the transmission speed ratio for reverse drive, speed-ratio control means for said transmission including a second member, means opertively connecting said shift and second members so that movement of said second member effects speed ratio shift movement of said shift member, said connection comprising a pair of racks operatively connected to one of said members and a gear operatively connected to the other of said members, said gear being axially movable to engage one or the other of said racks to reverse relative movement of said members, and means to prevent movement of said gear from one rack to the other except when said first-mentioned member is in its zero-speed-ratio position.

ROLAND CHILTON.

REFERENCES CITED

The following references are of record in the file of this patent:

UNITED STATES PATENTS

| Number | Name | Date |
|---|---|---|
| Re. 19,400 | Mock | Dec. 18, 1934 |
| 1,321,150 | Root | Nov. 11, 1919 |
| 1,819,237 | Fleischel | Aug. 18, 1931 |
| 1,838,096 | Fleischel | Dec. 29, 1931 |
| 1,861,008 | Hayes | May 31, 1932 |
| 2,016,835 | Nardone et al. | Oct. 8, 1935 |
| 2,075,404 | Nika | Mar. 30, 1937 |
| 2,100,748 | Prince | Nov. 30, 1937 |
| 2,102,781 | Bieretz | Dec. 21, 1937 |
| 2,106,822 | White | Feb. 1, 1938 |
| 2,115,284 | Pratt | Apr. 26, 1938 |
| 2,243,321 | Smith | May 27, 1941 |
| 2,250,344 | Alkan | July 22, 1941 |
| 2,252,644 | Robin et al. | Aug. 12, 1941 |
| 2,274,224 | Vickers | Feb. 24, 1942 |
| 2,278,099 | Bennetch | Mar. 31, 1942 |
| 2,349,297 | Neracher et al. | May 23, 1944 |
| 2,376,545 | Livermore | May 22, 1945 |
| 2,386,174 | Randol | Oct. 2, 1945 |
| 2,404,330 | Wallace et al. | July 16, 1946 |
| 2,407,840 | Leonard | Sept. 17, 1946 |